US008250588B2

(12) United States Patent
Allen et al.

(10) Patent No.: US 8,250,588 B2
(45) Date of Patent: Aug. 21, 2012

(54) PERSISTING APPLICATION STATE

(75) Inventors: Nicholas A. Allen, Redmond, WA (US);
Justin D. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 12/485,771

(22) Filed: Jun. 16, 2009

(65) Prior Publication Data
US 2010/0319006 A1 Dec. 16, 2010

(51) Int. Cl.
*G06F 3/00* (2006.01)
*G06F 9/44* (2006.01)
(52) U.S. Cl. .................. 719/318; 719/328; 717/131
(58) Field of Classification Search .............. None
See application file for complete search history.

(56) References Cited

U.S. PATENT DOCUMENTS

| 5,721,904 | A | 2/1998 | Ito |
| 6,073,140 | A | 6/2000 | Morgan |
| 6,105,148 | A | 8/2000 | Chung et al. |
| 6,112,222 | A | 8/2000 | Govindaraju |
| 6,442,748 | B1 | 8/2002 | Bowman-Amuah |
| 6,457,003 | B1 | 9/2002 | Gajda |
| 6,457,065 | B1 | 9/2002 | Rich |
| 6,591,277 | B2 | 7/2003 | Spence |
| 6,934,755 | B1 | 8/2005 | Saulpaugh et al. |
| 7,305,423 | B2 | 12/2007 | Starbuck |
| 7,313,727 | B2 | 12/2007 | Cabrera et al. |
| 7,349,512 | B2 | 3/2008 | Rausch |
| 2002/0083252 | A1 | 6/2002 | Armstrong |
| 2005/0132250 | A1 | 6/2005 | Hansen et al. |
| 2005/0262310 | A1 | 11/2005 | Starbuck |
| 2005/0278341 | A1 | 12/2005 | Kostadinov |
| 2006/0020570 | A1 | 1/2006 | Wu |
| 2006/0136279 | A1* | 6/2006 | Maybee et al. ............... 705/9 |
| 2007/0156486 | A1 | 7/2007 | Sanabria et al. |
| 2008/0319957 | A1 | 12/2008 | Muralidhar |
| 2009/0282396 | A1 | 11/2009 | Boyer |
| 2010/0122239 | A1* | 5/2010 | Neufeld et al. .............. 717/131 |
| 2011/0138398 | A1 | 6/2011 | Allen |
| 2011/0239230 | A1 | 9/2011 | Allen |

OTHER PUBLICATIONS

Lumpp, Th., et al., "From high availability and disaster recovery to business continuity solutions", IBM Systems Journal, vol. 47, No. 4, Jun. 3, 2008, pp. 605-619.
Wang, Lan, et al., "Persistent Detection and Recovery of State Inconsistencies", Aug. 8, 2006, 23 pages.
Rodriguez, Jesus, "Window Workflow Foundation Runtime Services; The Persistence Service", Oct. 5, 2005, 14 pages.

(Continued)

*Primary Examiner* — Kenneth Tang
(74) *Attorney, Agent, or Firm* — Workman Nydegger

(57) ABSTRACT

The present invention extends to methods, systems, and computer program products for persisting application state. Through decoupling an application host from an instance store, the application host can be used with many different persistence stores and persistence administration tools. Further, a given persistence store can be used with many different application hosts and application host extensions. Accordingly, applications can benefit from periodically persisting work to any of a variety of instance stores even if the applications are changed or are not natively configured for use with a particular instance store. Using persistence providers an application host can also more easily coordinate the persisted state with runtime state to ensure that a consistent checkpoint is created. Persistence providers can also be used to compensate for application host extensions and persistence administration tools that add coordination requirements that cannot be predicted at the time that the application is originally developed.

20 Claims, 5 Drawing Sheets

OTHER PUBLICATIONS

Adya, Atul, et al., "Efficient Optimistic Concurrency Control Using Loosely Synchronized Clocks", Proceedings of the ACM SIGMOD Internationl Conference on Management of Data, San Jose, CA, May 1995, 12 pages.

Raynal, Michel, et al. "Logical Time: Capturing Causality in Distributed Systems", Feb. 1996, pp. 49-56.

Liskov, Barbara, et al., "Providing Persistent Objects in Distributed Systems", Proceedings of ECOOP'99, 1999, 28 pages.

Maria Del Mar Roldan-Garcia, "A Survey on Disk Oriented Querying and Reasoning on the Semantic Web", Prceedings of the 22nd International Conference on Data Engineering Workshops, 2006, 8 pages.

MSDN, "Load Workflow Command Class", 2010 Microsoft Corporation, 2 pages.

Rodriguez, Jesus, "Jesus Rodriguez's WebLog", Microsoft MVP BizTalk Server Oracle ACE, Oct. 5, 2005, 16 pages.

MSDN, "Instance Stores", 2010 Microsoft Corporation, 3 pages.

Sun Microsystems, "Sun Java System Application Server 9.1 Developer's Guide", May 2008, 316 pages.

Kahlon, V. et al, "Reasoning about Threads Communicating via Locks Computer Aided Verification", Lecture Notes in Computer Science, 2005, vol. 3576/2005, pp. 267-274.

Rajwaro, R. et al., "Transactional Execution: Toward Reliable, High-Performance Multithreading", IEEE Computer Society, IEEE Micro, 2003, vol. 23, No. 6, pp. 117-125.

U.S. Appl. No. 13/484,911, filed May 31, 2012, Allen.

U.S. Appl. No. 12/729,836, mailing date Jun. 26, 2012, Notice of Allowance.

* cited by examiner

PERSISTING APPLICATION STATE

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Long-running applications, such as, for example, workflow applications, often benefit from periodically persisting their work to allow for the application to recover after errors, crashes, or machine failures. Persisting work permits applications to temporarily go idle and have their resources reassigned. To persist work, an application host coordinates the persisted state with runtime state to ensure that a consistent checkpoint is created. For example, the persisted state may need to coordinate with application transactions, message notifications, locks, local state caches, etc.

Many approaches to persisting work include a tightly coupled application host and state persistence system. That is, an application host is specifically designed to operate with the state persistence system and vice versa. Thus, to achieve new functionality using these approaches, both the application host and state persistence system must be updated simultaneously.

Additionally, the tight coupling used in many approaches limits the interoperability of application hosts and state persistence systems. That is, unless an application host and state persistence system are specifically designed for one another, there is little, if any, potential for interoperation. Further, application host extensions and persistence administration tools often add coordination requirements that cannot be predicted at the time that the application is originally developed. This adds further difficulties to facilitating interoperation between divergent application hosts and state persistence systems.

Accordingly, at least due to the inability of different application hosts and state persistence systems to interoperate, entities are often forced to utilize a number of different tightly coupled persistence approaches in parallel. Utilizing different approaches in parallel consumes increased computing resources and leads to increased administrative overhead. The difficulties are further exacerbated as the number of tightly coupled approaches increases.

BRIEF SUMMARY

The present invention extends to methods, systems, and computer program products for persisting application state. Embodiments of the invention include methods for implementing a persistence command contained in a defined command set. A persistence provider provides a handle for an instance store to an application host. The handle is associable with context information related to persistence commands contained in the defined command set issued by the application host. The associable context information is accumulated for the handle from using the handle to access the instance store.

The persistence provider receives a persistence command issued from the application host in the context of the context information currently associated with the handle and directed to the instance store. The persistence command is contained in the defined command set and is associated with application state for an application. The persistence provider translates the received persistence command into one or more compatible persistence commands contained in the second different defined command set. The persistence provider submits the one or more compatible persistence commands in the context of the context information currently associated with the handle to the instance store. Accordingly, the instance store is instructed to perform the received persistence command and return results of processing the received persistence command.

The persistence provider receives results from the instance store in accordance with the second different defined command set. Each result is consistent with the atomic execution of one or more of the one or more compatible persistence commands. The results are returned from the instance store to the persistence provider in response to the instance store processing the one or more compatible persistence commands. The persistence provider accumulates additional context information to associate with the handle based on a portion of the returned results received by the persistence provider in response to the instance store processing the one or more compatible persistence commands.

The persistence provider formulates the received results into a view for the application host in accordance with the defined command set. The view indicates the state of the instance store consistent with atomic execution of received persistence commands, including the application state. The view is formulated subsequent and in response to the persistence provider receiving results from the instance store. The persistence provider provides the formulated view to the application host.

Embodiments of the invention include mixing and matching persistence providers with application hosts and instance stores to facilitate compatibly persisting application state. Application hosts can interoperate with multiple persistence providers to persist application state to corresponding multiple instance stores. Further, multiple applications hosts with different command sets can use appropriately configured persistence providers to persist application state to the same instance store.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
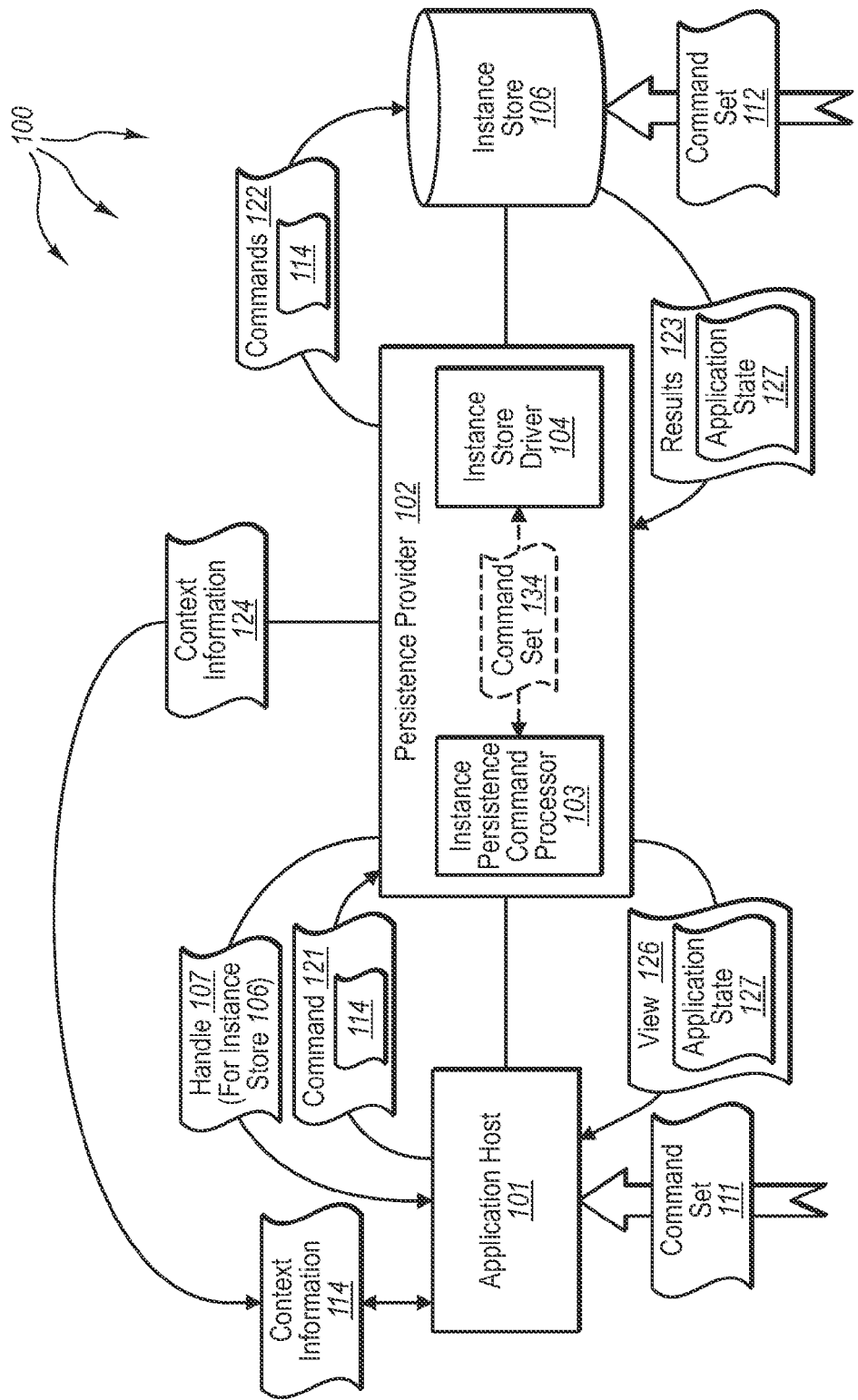
FIG. 1 illustrates an example computer architecture that facilitates persisting application state.

The present invention extends to methods, systems, and computer program products for persisting application state. Embodiments of the invention include methods for implementing a persistence command contained in a defined command set. A persistence provider provides a handle for an instance store to an application host. The handle is associable with context information related to persistence commands contained in the defined command set issued by the application host. The associable context information is accumulated for the handle from using the handle to access the instance store.

The persistence provider receives a persistence command issued from the application host in the context of the context information currently associated with the handle and directed to the instance store. The persistence command is contained in the defined command set and is associated with application state for an application. The persistence provider translates the received persistence command into one or more compatible persistence commands contained in the second different defined command set. The persistence provider submits the one or more compatible persistence commands in the context of the context information currently associated with the handle to the instance store. Accordingly, the instance store is instructed to perform the received persistence command and return results of processing the received persistence command.

The persistence provider receives results from the instance store in accordance with the second different defined command set. Each result is consistent with the atomic execution of one or more of the one or more compatible persistence commands. The results are returned from the instance store to the persistence provider in response to the instance store processing the one or more compatible persistence commands. The persistence provider accumulates additional context information to associate with the handle based on a portion of the returned results received by the persistence provider in response to the instance store processing the one or more compatible persistence commands.

The persistence provider formulates the receive results into a view for the application host in accordance with the defined command set. The view indicates the state of the instance store consistent with atomic execution of received persistence commands, including the application state. The view is formulated subsequent and in response to the persistence provider receiving results from the instance store. The persistence provider provides the formulated view to the application host.

Embodiments of the invention include mixing and matching persistence providers with application hosts and instance stores to facilitate compatibly persisting application state. Application hosts can interoperate with multiple persistence providers to persist application state to corresponding multiple instance stores. Further, multiple applications hosts with different command sets can use appropriately configured persistence providers to persist application state to the same instance store.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates persisting application state. Referring to FIG. 1, computer architecture 100 includes application host 101, persistence provider 102, and instance store 106. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, application host 101 is configured to issue persistence commands contained in command set 111. Application host 101 can send commands along with accumulated context information for an instance store. Context information can be accumulated through prior interactions with an instance store. Application host 101 can also present views containing application state from an instance store. Application host 101 can be an entity, such as, for example, a program or administrative tool that manipulates instances stored in instance store 106.

Instance store 106 is configured to receive and process persistence commands contained in command set 112. Instance store 106 can persist application state as well as return persisted state to a requesting entity in response to persistence commands.

Generally, persistence provider 102 is configured to translate persistence commands from one command set into persistence commands in another different commands set. For example, persistence provider 102 can translate persistence commands contained in command set 111 into persistence commands contained in command set 112.

As depicted, persistence provider 102 includes instance persistence command processor 103 and instance store driver 104. Instance persistence command processor 103 defines the contract between application host 101 and instance store 106. As such, instance persistence command processor 103 is an interface between application host 101 and instance store 106 that permits application host 101 to provide commands that modify or inspect instance store 106. For example, the combination of an instance persistence command processor 103 and an instance store 106 implemented using SQL Server might be called a SQL persistence provider. The persistence provider modifies the state of the instance store according to a host's commands using a set of permissible state modifications defined by the instance persistence command processor.

Instance store driver 104 is configured to break down commands when necessary for compatible communication with instance store 106. For example, command set 112 may lack a particular command from command set 111. However, it may be that using a combination of two or more commands from command set 112, that the command from command set 111 can be realized. Thus, when persistence provider 102 detects that a persistence command is not included in command set 112, persistence provider can refer to instance store driver 104 to break the command down into other compatible commands.

Figure 3:
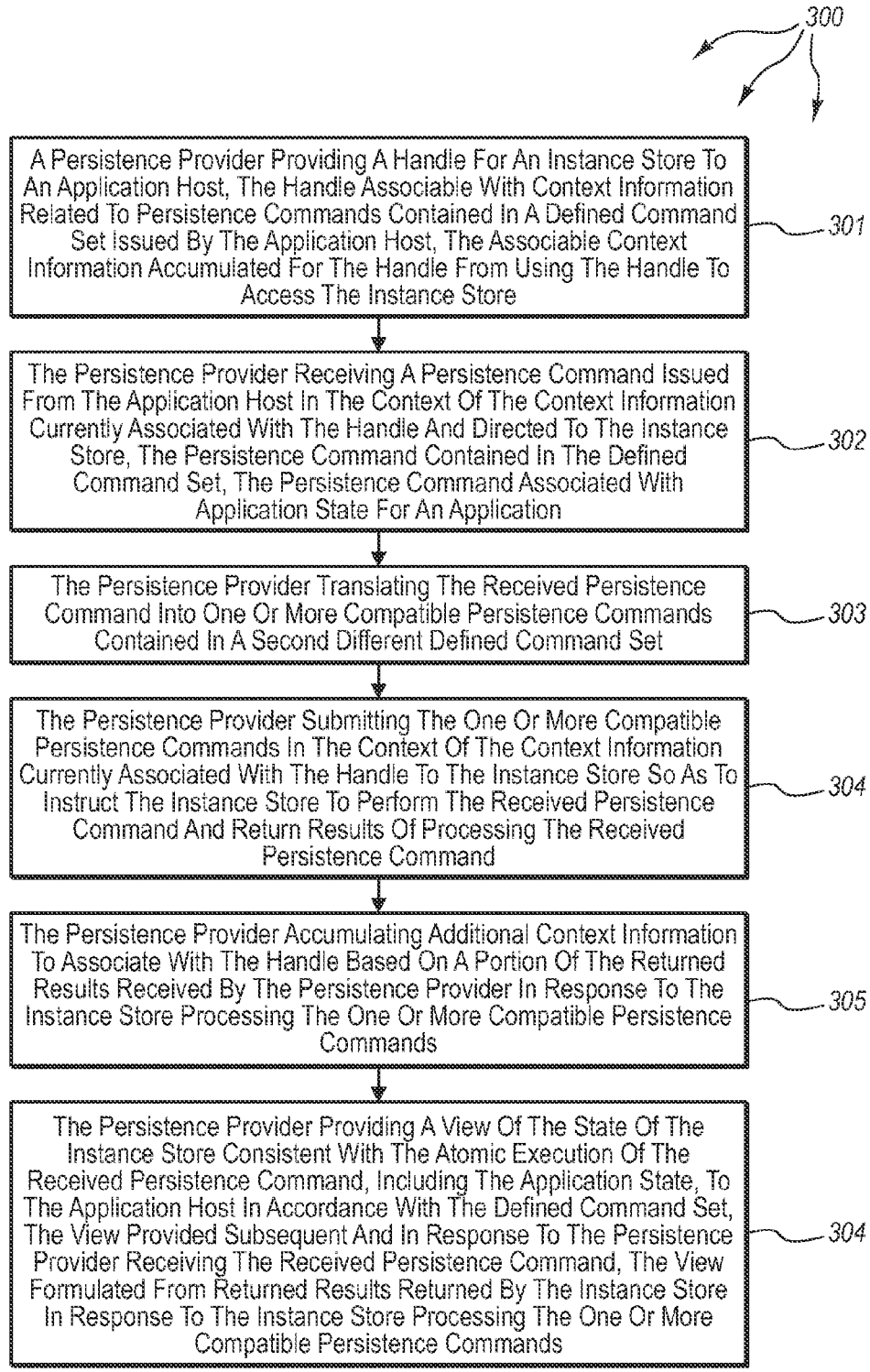
FIG. 3 illustrates a flow chart of an example method for implementing a persistence command contained in the defined command set issued from an application host to an instance store.

FIG. 3 illustrates a flow chart of an example method 300 for implementing a persistence command contained in the defined command set issued from an application host to an instance store. The method 300 will be described with respect to the components and data in computer architecture 100.

Method 300 includes an act of the persistence provider providing a handle for the instance store to the application host, the handle associable with context information related to persistence commands contained in the defined command set issued by the application host, the associable context information accumulated for the handle from using the handle to access the instance store (act 301). For example, persistence provider 102 can provide handle 107 to application host 101. Handle 107 can be for accessing instance store 106. Handle 107 is associable with context information related to persistence commands contained in command set 111. Context information, such as, for example, context information 114 can be accumulated for the handle from using the hand to access instance store 101.

Figure 5:
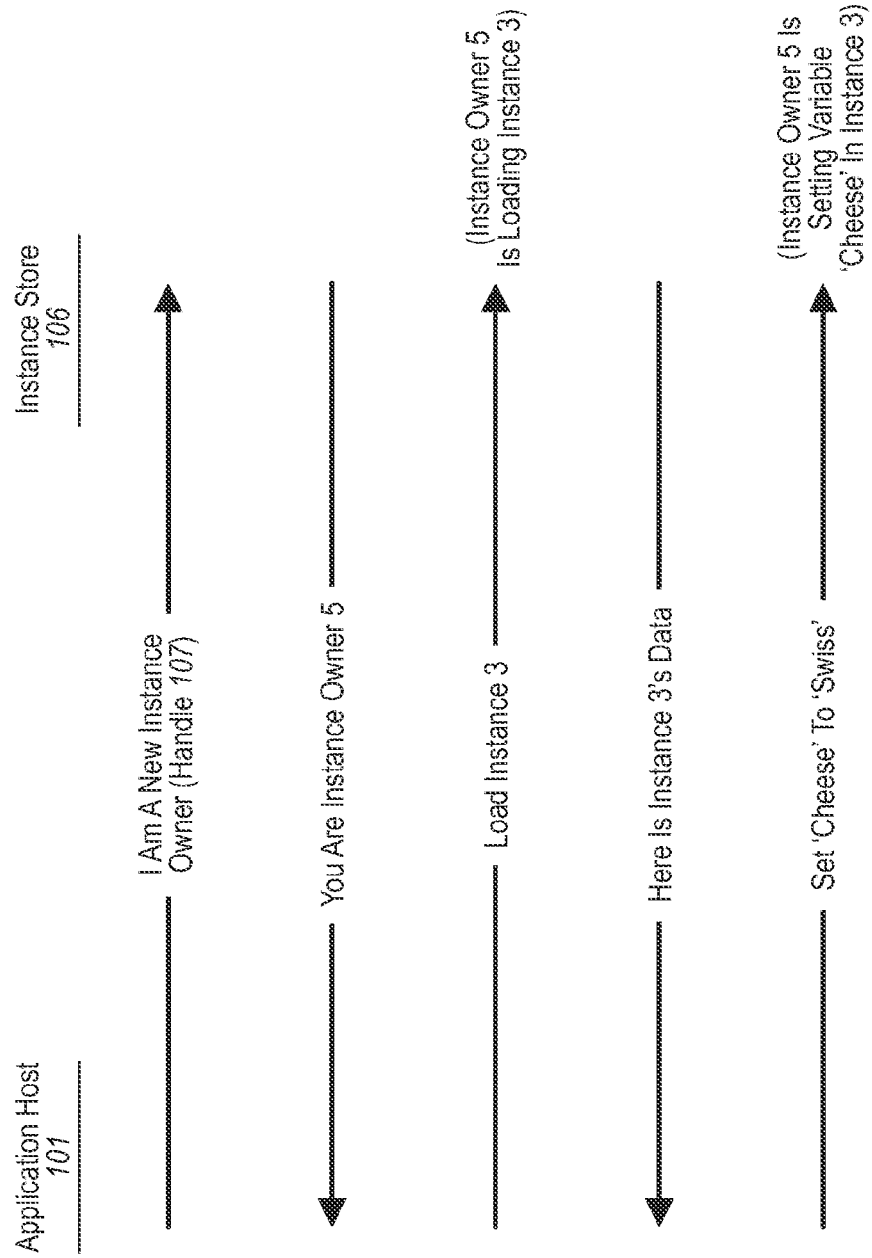
FIG. 5 depicts an example of accumulating context for association with a handle.

FIG. 5 depicts an example of accumulating context for association with a handle. Application 101 can send an indication that it is a new instance owner (e.g., sending handle 107). Instance 106 can respond indicating to application host 101 that it is instance owner 5. Application 101 can subsequently issue a command to load instance 3. The command can be sent in the context of instance owner 5 such that instance store 106 is aware that instance owner 5 is loading instance 3. Instance store 106 can respond by sending data for instance 3 to application host 101 (i.e., instance owner 5). Subsequently, application host 101 can send a command to set the variable 'cheese' to 'swiss'. The command can be sent in the context of instance owner 5 and instance 3 such that instance store 106 is aware that instance owner 5 is setting variable 'cheese' to 'swiss' in instance 3.

Method 300 includes an act of the persistence provider receiving a persistence command issued from the application host in the context of the context information currently associated with the handle and directed to the instance store, the persistence command contained in the defined command set, the persistence command associated with application state for an application (act 302). For example, application host 101 can send command 121 (e.g., to modify or inspect instance store 106), in the context of context information 114, to persistence provider 102. Persistence provider 102 can receive command 121 from application host 101. Command 121 can be contained in command set 111 and can be associated with application state for application host 101.

Method 300 includes an act of the persistence provider translating the received persistence command into one or more compatible persistence commands contained in the second different defined command set (act 303). For example, instance store driver 104, potentially through interoperation with instance persistence command processor 103, can translate command 121 into commands 122. When command 121 can be translated to a single similar command contained in command set 112, instance persistence command processor 103 is minimally, if at all, involved in the translation. On the other hand, it may be that command 121 is to be broken down into a plurality of commands in command set 112. When command 121 is to be broken down, instance store driver 104 identifies and controls the commands form command set 112 that are to be used and instance persistence processor 103 aids in decomposing the semantics of command 121.

Method 300 includes an act of the persistence provider submitting the one or more compatible persistence commands in the context of the context information currently associated with the handle to the instance store so as to instruct the instance store to perform the received persistence command and return results of processing the received persistence command (act 304). For example, persistence provider 102 can submit commands 122, in the context of context information 114, to instance store 106. Commands 122 can instruct instance store 106 to perform the equivalent of command 121 and return results of processing the equivalent of command 121.

In some embodiments, a persistence provider is configured to batch multiple commands from a command set together to be executed in a single operation by the instance store. For example, persistence provider 102 can batch multiple commands from command set 111 together to be executed in a single operation by instance store 106. Persistence provider 102 can batch up commands issued against different handles as they are received. Persistence provider 102 can then present results of the batched commands as if each of the multiple commands was executed separately. Thus, an application (e.g., application host 101) may be unaware that its command travelled along with a command issued against a different handle.

Method 300 includes an act of the persistence provider accumulating additional context information to associate with the handle based on a portion of the returned results received by the persistence provider in response to the instance store processing the one or more compatible persistence commands (act 305). For example, in response to commands 122, instance store 106 can return results 123 to persistence provider 102. Results 123 can include application state 127 that is relevant to command 121. Persistence provider 102 can accumulate context information 124 to associate with handle 107 based on a portion of results 123.

Method 300 includes an act of the persistence provider providing a view of the state of the instance store consistent with the atomic execution of the received persistence command, including the application state, to the application host in accordance with the defined command set, the view provided subsequent and in response to the persistence provider receiving the received persistence command, the view formulated from returned results returned by the instance store in response to the instance store processing the one or more compatible persistence commands (act 306). For example, persistence provider 102 can formulate results 123 into view 126 for application host 101 in accordance with command set 111. View 126 can indicate the state of instance store 106 consistent with atomic execution of command 121, including application state 127. Persistence provider 102 can provide view 126 to application host 101.

Figure 4:
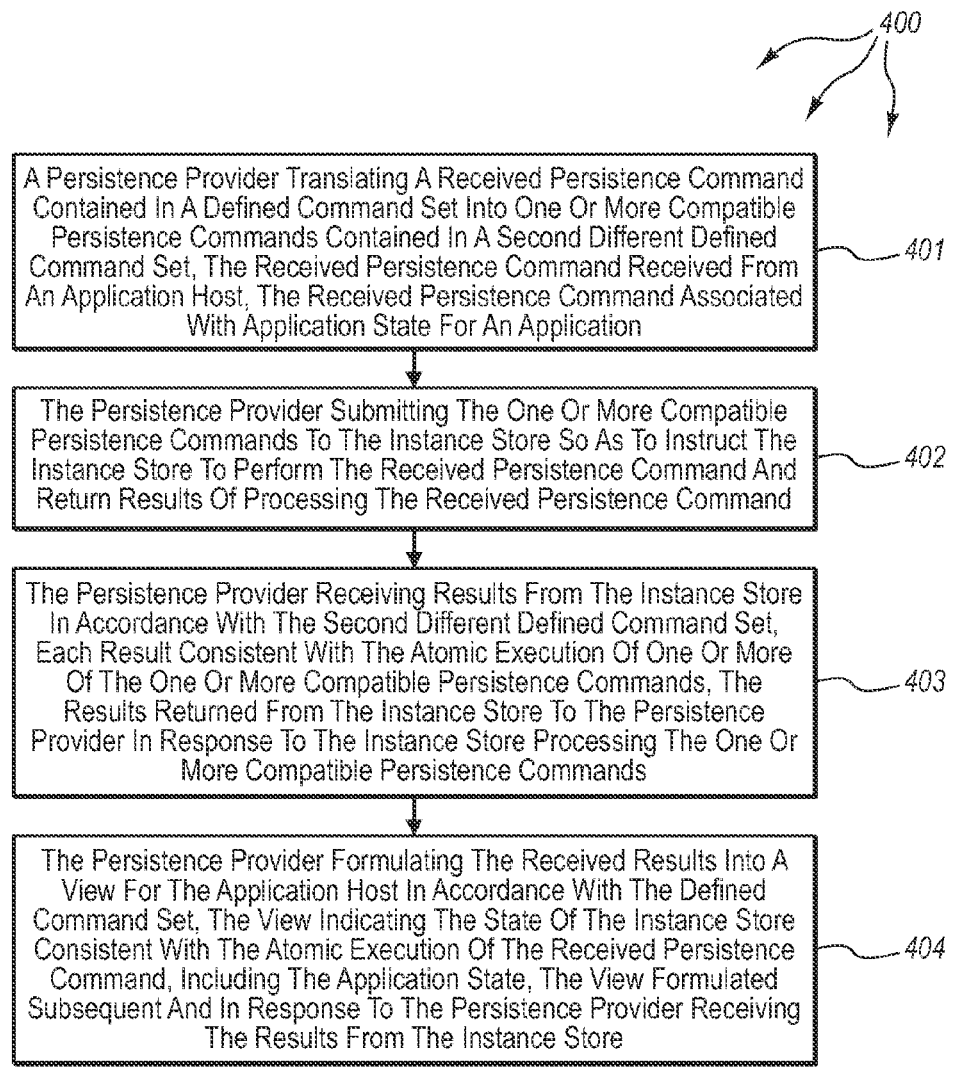
FIG. 4 illustrates a flow chart of an example method for persisting application state for implementing a persistence command contained in the defined command set issued from an application host to an instance store.

FIG. 4 illustrates a flow chart of an example method 400 for persisting application state for implementing a persistence command contained in the defined command set issued from an application host to an instance store. The method 400 will be described with respect to the components and data in computer architecture 100.

Method 400 includes an act of a persistence provider translating a received persistence command contained in the defined command set into one or more compatible persistence commands contained in the second different defined command set, the received persistence command received from the application host, the persistence command associated with application state for an application (act 401). For example, persistence provider 102 can translate command 121 from command set 111 into commands 122 from command set 112. Command 121 can be associated with application state for application host 101.

Method 400 includes an act of the persistence provider submitting the one or more compatible persistence commands to the instance store so as to instruct the instance store to perform the received persistence command and return results of processing the received persistence command (act 402). For example, persistence provider 102 can submit commands 122 to instance store 106 to instruct instance store 106 to perform command 121 and return results to persistence provider 102. In response, instance store 106 can process commands 122 and return results 123 to persistence provider 102. As previously described, instance store driver 104, potentially through interoperation with instance persistence command processor 103, can translate command 121 into commands 122. Instance store driver 104 can then submit commands 122 to instance store 106.

Method 400 includes an act of the persistence provider receiving results from the instance store in accordance with the second different defined command set, each result consistent with the atomic execution of one or more of the one or more compatible persistence commands, the results returned from the instance store to the persistence provider in response to the instance store processing the one or more compatible persistence commands (act 403). For example, persistence provider 102 can receive results 123 from instance store 106 in accordance with command set 112. Each result in results 123 is consistent with atomic execution of a command from commands 122.

In some embodiments, instance persistence command processor 103 and instance store driver 104 use a third, fixed command set for expressing responses received from an instance store. For example, instance persistence command processor 103 and instance store driver 104 can use command set 134 for expressing responses received from instance store 106. Responses to commands expressed in command set 112 (e.g., results 123) can be translated into command set 134 and can be accumulated over time. Subsequently, accumulated responses expressed in command set 134 can be translated into a command in command set 111. Accordingly, instance persistence command processor 103 is relieved from having to know how to merge responses expressed in command set 112.

Persistence provider 102 can also be configured to throttle the rate of command executions across one more handles for an instance store. For example, persistence provider 102 can throttle the rate of command executions across handles for instance store 106. Thus, depending on the rate of executions when command 121 is received, persistence provider 102 can delay the submission of commands 122 for some amount of time.

Method 400 includes an act of the persistence provider formulating the received results into a view for the application host in accordance with the defined command set, the view indicating the state of the instance store consistent with the atomic execution of the received persistence command, including the application state, the view formulated subsequent and in response to the persistence provider receiving the results from the instance store (act 404). For example, persistence provider 102 can formulate results 123 into view 126 in accordance with command set 111. View 126 can indicate the state of instance store 106 consistent with atomic execution of command 121, including application state 127. When a third, fixed command set is not used, instance persistence command processor 103 can be configured to formulate results 123 as expressed in command set 112 into view 126. On the other hand, when a third, fixed command set (e.g., command set 143) is used, instance persistence command processor 103 can be configured to formulate results 123 as expressed in the third, fixed command set into view 126.

Embodiments of the invention include pluggable persistence providers that can be mixed and matched with application hosts and instance stores to facilitate compatibly persisting application state. Application hosts can interoperate with multiple persistence providers to persist application state to corresponding multiple instance stores. Further, multiple applications hosts with different command sets can use appropriately configured persistence providers to persist application state to the same instance store.

Figure 2:
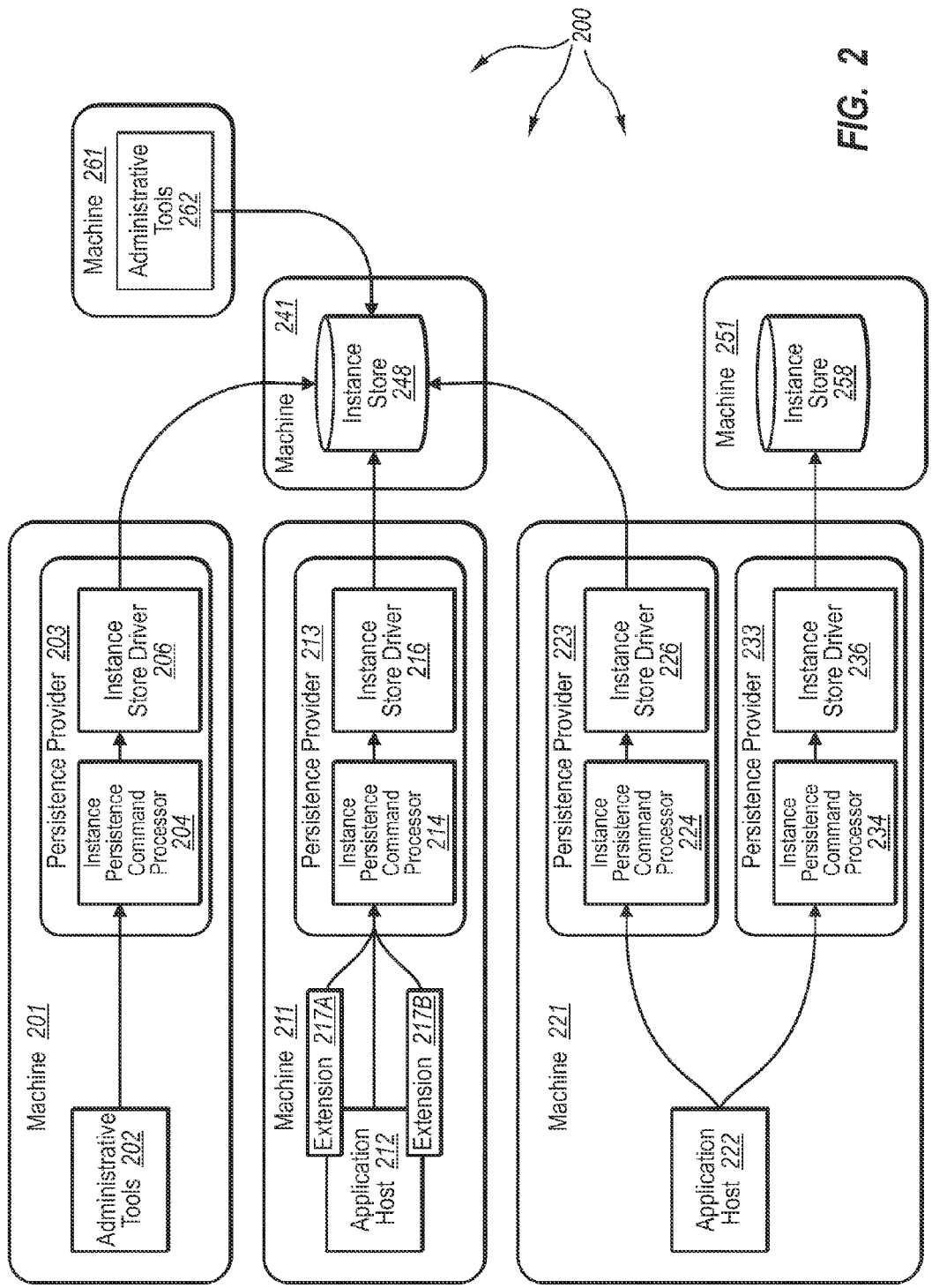
FIG. 2 illustrates another example computer architecture that facilitates persisting application state.

As such, FIG. 2 illustrates another example computer architecture 200 that facilitates persisting application state. As depicted, computer architecture includes machines 201, 211, 221, 241, 251, and 261, which may be connected to one another over a computer network, such as, for example, a Local Area Network ("LAN"), a Wide Area Network ("WAN"), and even the Internet.

Machine 201 includes application host 202 and persistence provider 203. Machine 211 includes application host 212 and persistence provider 213. The functionality of application host 212 is extended by the functionality of extensions 217A and 217B. Machine 221 includes application host 222 and persistence providers 223 and 233. Machine 241 includes instance store 248. Machine 251 includes instance store 258. Machine 261 includes administrative tools 262.

As depicted, persistence providers 203, 213, and 223 are plugged-in at machines 201, 211, 221 respectively. Persistence providers 203, 213, and 223 translate commands from administrative tools 202, application host 212 and extensions 217A and 217B, and application host 222 into commands compatible with the command set for instance store 248. Administrative tools 262 can also interact directly with instance store 248. For example, administrative tools 262 and instance store 248 may share the same command set.

More specifically, instance persistence command processor 204 defines the contact between administrative tools 202 and instance store 248. When appropriate, instance store driver 206 is configured to break down commands in the command set of administrative tools 202 into one or more commands in the command set of instance store 248. Similarly, instance persistence command processor 214 defines the contact between application host 212 and extensions 217A and 217B and instance store 248. When appropriate, instance store driver 216 is configured to break down commands in the command set of application host 212 and extensions 217A and 217B into one or more commands in the command set of instance store 248. Likewise, instance persistence command processor 224 defines the contact between application host 222 and instance store 248. When appropriate, instance store driver 226 is configured to break down commands in the command set of administrative tools 222 into one or more commands in the command set of instance store 248.

Accordingly, a plurality of differently configured application hosts and administrative tools can compatibly interact with instance store 248 and issue persistence commands (e.g., to modify or inspect) to instance store 248. Further, some administrative tools and applications hosts can utilize persistence providers to interact with instance store 248, while other administrative tools and applications interact with instance store 248 using its native command set.

Additionally, machine 221 includes persistence provider 233. Persistence provider 233 translates commands from application host 222 into commands compatible with the command set for instance store 258. More specifically, instance persistence command processor 234 defines the contact between application host 222 and instance store 258. When appropriate, instance store driver 236 is configured to break down commands in the command set of application host 222 into one or more commands in the command set of instance store 258. Thus, persistence providers 223 and 233 facilitate compatible interaction between application host 222 and instance stores 248 and 258 respectively. As such, persistence providers can also facilitate an application compatibly interacting with a plurality of different instance stores.

Thus, through decoupling an application host from an instance store, the application host can be used with many different persistence stores and persistence administration tools. Further, a given persistence store can be used with many different application hosts and application host extensions. Accordingly, applications can benefit from periodically persisting work to any of a variety of instance stores even if the applications are changed or are not natively configured for use with a particular instance store. The use of persistence providers expands the possibilities for applications to store work to allow for the application to recover after errors, crashes, or machine failures; and to allow for the application to temporarily go idle and have resources reassigned.

Using persistence providers an application host can also more easily coordinate the persisted state with runtime state to ensure that a consistent checkpoint is created. For example, the persisted state can coordinate with application transactions, message notifications, locks, and local state caches that would otherwise not be possible. Persistence providers can also be used to compensate for application host extensions and persistence administration tools that add coordination requirements that cannot be predicted at the time that the application is originally developed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer architecture including one or more processors and system memory, the computer architecture also including an application host, a persistence provider, and an instance store, the application host configured to issue persistence commands from a defined command set, the persistence commands for persisting data to and accessing data from instance stores configured to receive and process persistence commands contained in the defined command set, the instance store configured to receive and process persistence commands from a second different defined command set such that the instance store is not fully compatible with persistence commands contained in the defined command set, a method for implementing a persistence command contained in the defined command set issued from the application host to the instance store, the method comprising:

an act of the persistence provider providing a handle for the instance store to the application host, the handle associable with context information related to persistence commands contained in the defined command set issued by the application host, the associable context information accumulated for the handle from using the handle to access the instance store;

an act of the persistence provider receiving a persistence command issued from the application host in the context of the context information currently associated with the handle and directed to the instance store, the persistence command contained in the defined command set, the persistence command associated with application state for an application;

an act of the persistence provider translating the received persistence command into one or more compatible persistence commands contained in the second different defined command set;

an act of the persistence provider submitting the one or more compatible persistence commands in the context of the context information currently associated with the handle to the instance store so as to instruct the instance store to perform the received persistence command and return results of processing the received persistence command;

an act of the persistence provider accumulating additional context information to associate with the handle based on a portion of the returned results received by the persistence provider in response to the instance store processing the one or more compatible persistence commands;

an act of the persistence provider providing a view of the state of the instance store consistent with the atomic execution of the received persistence command, including the application state, to the application host in accordance with the defined command set, the view provided subsequent and in response to the persistence provider receiving the received persistence command, the view formulated from returned results returned by the instance store in response to the instance store processing the one or more compatible persistence commands.

2. The method as recited in claim 1, wherein an act of the persistence provider receiving a persistence command issued from the application host comprises an act of the persistence provider receiving a persistence command issued from one of: an administrative tool and an extension that extends the functionality of the application host.

3. The method as recited in claim 1, wherein an act of the persistence provider receiving a persistence command issued from the application host comprises an act of the persistence provider batching the persistence command with one or more other persistence commands submitted against different handles for the instance store.

4. The method as recited in claim 1, further comprising prior to translating the received persistence command: an act of delaying the submission of the persistence command for a specified period of time to throttle the rate of command executions across handles for the instance store.

5. The method as recited in claim 1, wherein the act of the persistence provider translating the received persistence command into one or more compatible persistence commands contained in the second different defined command set comprises an act of an instance store driver breaking down the received persistence command into a plurality of compatible persistence commands representing the equivalent of the receive persistence command.

6. The method as recited in claim 1, wherein the act of the persistence provider accumulating additional context information to associate with the handle comprises an act of accumulating additional context information to supplement existing context information obtained from previous uses of the handle to interact with the instance store.

7. The method as recited in claim 1, wherein the computer architecture further includes a second persistence provider and a second instance store, and further comprising:

an act of the second persistence provider providing a second handle for the second instance store to the application host, the second handle associable with context information related to persistence commands contained in the defined command set issued by the application host, the associable context information accumulated for the second handle from using the second handle to access the second instance store;

an act of the second persistence provider receiving a second persistence command issued from the application host in the context of the context information currently associated with the second handle and directed to the instance store, the persistence command contained in the defined command set, the persistence command associated with application state for an second application;

an act of the second persistence provider translating the received persistence command into one or more further compatible persistence commands contained in the third different defined command set, the third different defined command set defining persistence commands for the second instance store;

an act of the persistence provider submitting the one or more further compatible persistence commands in the context of the context information currently associated with the second handle to the second instance store so as to instruct the second instance store to perform the second received persistence command and return results of processing the second received persistence command;

an act of the persistence provider accumulating additional context information to associate with the second handle based on a portion of the returned results received by the second persistence provider in response to the second instance store processing the one or more further compatible persistence commands;

an act of the second persistence provider providing a view of the state of the second instance store consistent with the atomic execution of the received second persistence command, including the application state, to the application host in accordance with the defined command set, the view provided subsequent and in response to the second persistence provider receiving the received persistence command, the view formulated from returned results returned by the second instance store in response to the second instance store processing the one or more further compatible persistence commands.

8. The method as recited in claim 1, wherein the computer architecture further includes an additional application host and an additional persistence provider and further comprising:
an act of the additional persistence provider providing an additional handle for the instance store to the additional application host, the additional handle associable with context information related to persistence commands contained in the additional defined command set issued by the additional application host, the associable context information accumulated for the additional handle from using the additional handle to access the instance store;
an act of the additional persistence provider receiving an additional persistence command issued from the additional application host in the context of the context information currently associated with the additional handle and directed to the instance store, the additional persistence command contained in the additional defined command set, the additional persistence command associated with application state for an additional application;
an act of the persistence provider translating the received additional persistence command into one or more further compatible persistence commands contained in the second different defined command set;
an act of the additional persistence provider submitting the one or more further compatible persistence commands in the context of the context information currently associated with the additional handle to the instance store so as to instruct the instance store to perform the received additional persistence command and return results of processing the received additional persistence command;
an act of the additional persistence provider accumulating additional context information to associate with the additional handle based on a portion of the returned results received by the additional persistence provider in response to the instance store processing the one or more further compatible persistence commands;
an act of the additional persistence provider providing a view of the state of the instance store consistent with the atomic execution of the received additional persistence command, including the application state, to the additional application host in accordance with the additional defined command set, the view provided subsequent and in response to the additional persistence provider receiving the additional received persistence command, the view formulated from returned results returned by the instance store in response to the instance store processing the one or more further compatible persistence commands.

9. The method as recited in claim 1, wherein the received persistence command is one of a command to modify or inspect the instance store.

10. The method as recited in claim 1, wherein the accumulated context includes one or more of an instance owner identifier and an instance identifier.

11. In a computer architecture including one or more processors and system memory, the computer architecture also including an application host, a persistence provider, and an instance store, the application host configured to issue persistence commands from a defined command set, the persistence commands for persisting data to and accessing data from instance stores configured to receive and process persistence commands contained in the defined command set, the instance store configured to receive and process persistence commands from a second different defined command set such that the instance store is not fully compatible with persistence commands contained in the defined command set, a method for implementing a persistence command contained in the defined command set issued from the application host to the instance store, the method comprising:
an act of the persistence provider translating a received persistence command contained in the defined command set into one or more compatible persistence commands contained in the second different defined command set, the received persistence command received from the application host, the received persistence command associated with application state for an application;
an act of the persistence provider submitting the one or more compatible persistence commands to the instance store so as to instruct the instance store to perform the received persistence command and return results of processing the received persistence command;
an act of the persistence provider receiving results from the instance store in accordance with the second different defined command set, each result consistent with the atomic execution of one or more of the one or more compatible persistence commands, the results returned from the instance store to the persistence provider in response to the instance store processing the one or more compatible persistence commands; and
an act of the persistence provider formulating the received results into a view for the application host in accordance with the defined command set, the view indicating the state of the instance store consistent with the atomic execution of the received persistence command, including the application state, the view formulated subsequent and in response to the persistence provider receiving the results from the instance store.

12. The method as recited in claim 11, wherein an act of the persistence provider translating a received persistence command contained in the defined command set into one or more compatible persistence commands contained in the second different defined command set comprises an act of the persistence provider translating a persistence command issued from one of: an administrative tool and an extension that extends the functionality of the application host.

13. The method as recited in claim 11, wherein an act of the persistence provider translating a received persistence command contained in the defined command set into one or more compatible persistence commands contained in the second different defined command set comprises an act of the persistence provider breaking down the received persistence command into a plurality of compatible persistence commands representing the equivalent of the receive persistence command.

14. The method as recited in claim 11, wherein the persistence provider includes an instance persistence command processor and an instance store driver and, further comprises:
an act of the instance store driver converting the results expressed in the second different defined command set into a fixed command set used between the instance store and the instance persistence processor; and
an act of the instance store driver forwarding the results expressed in the fixed command set to the instance persistence command processor.

15. The method as recited in claim 14, further comprising an act of the instance persistence command processor accumulating the results expressed in the fixed command set along with other previously received results in the fixed command set such that the instance persistence command processor is relieved from having to merge results expressed in the second different defined command set.

16. The method as recited in claim 11, wherein the computer architecture further includes a second persistence provider and a second instance store, and further comprising:
    an act of the second persistence provider translating a second received persistence command contained in the defined command set into one or more further compatible persistence commands contained in a third different defined command set, the second received persistence command received from the application host, the third different defined command set defining persistence commands for the second instance store, the second persistence command associated with application state for the application;
    an act of the second persistence provider submitting the one or more further compatible persistence commands to the second instance store so as to instruct the second instance store to perform the second received persistence command and return results of processing the second received persistence command;
    an act of the second persistence provider receiving results from the second instance store in accordance with the third different defined command set, each result consistent with the atomic execution of one or more of the one or more further compatible persistence commands, the results returned from the second instance store to the second persistence provider in response to the second instance store processing the one or more further compatible persistence commands; and
    an act of the second persistence provider formulating the received results into a view for the application host in accordance with the defined command set, the view indicating the state of the second instance store consistent with the atomic execution of the second received persistence command, including the application state, the view formulated subsequent and in response to the second persistence provider receiving the results from the second instance store.

17. The method as recited in claim 11, wherein the computer architecture further includes an additional application host and an additional persistence provider and further comprising:
    an act of the additional persistence provider translating an additional received persistence command contained in an additional defined command set into one or more further compatible persistence commands contained in the second different defined command set, the additional received persistence command received from the additional application host, the additional persistence command associated with application state for an additional application;
    an act of the additional persistence provider submitting the one or more further compatible persistence commands to the instance store so as to instruct the instance store to perform the additional received persistence command and return results of processing the additional received persistence command;
    an act of the additional persistence provider receiving results from the instance store in accordance with the second different defined command set, each result consistent with the atomic execution of one or more of the one or more further compatible persistence commands, the results returned from the instance store to the additional persistence provider in response to the instance store processing the one or more compatible persistence commands; and
    an act of the additional persistence provider formulating the received results into a view for the application host in accordance with the additional defined command set, the view indicating the state of the instance store consistent with the atomic execution of the additional received persistence command, including the application state, the view formulated subsequent and in response to the persistence provider receiving the results from the instance store.

18. A computer system for persisting application state, the computer system comprising:
    one or more processors;
    system memory;
    one or more computer storage media having stored thereon computer-executable instructions representing an application host, a persistence provider, and an instance store, the persistence provider configured to:
        provide a handle for the instance store to the application host, the handle associable with context information related to persistence commands contained in the defined command set issued by the application host, the associable context information accumulated for the handle from using the handle to access the instance store;
        receive a persistence command issued from the application host in the context of the context information currently associated with the handle and directed to the instance store, the persistence command contained in the defined command set, the persistence command associated with application state for an application;
        translate the received persistence command into one or more compatible persistence commands contained in the second different defined command set;
        submit the one or more compatible persistence commands in the context of the context information currently associated with the handle to the instance store so as to instruct the instance store to perform the received persistence command and return results of processing the received persistence command;
        receive results from the instance store in accordance with the second different defined command set, each result consistent with atomic execution of at least one of the one or more compatible persistence commands;
        accumulate additional context information to associate with the handle based on a portion of the returned results;
        formulate received results into a view for the application host in accordance with the defined command set, the view indicating the state of the instance store consistent with atomic execution of the received persistence command, including the application state, the view formulated subsequent and in response to the persistence provider receiving results from the instance store;
        provide the view of the state of the instance store to the application host;
    wherein the application host is configured to:
        issue the persistence command to the persistence provider, the persistence command issued in the context of context information currently associated with a handle, the persistence command contained in the defined command set; and receive the view of the state of the instance store consistent with the atomic execution of the received persistence command, including the application state, from the persistence provider in accordance with the defined command set; and wherein the instance store is configured to:
receive one or more compatible persistence commands in the context of the context information currently associated with the handle from the persistence provider, the one or more compatible persistence commands instructing the instance store to perform the received persistence command and return results of processing the received persistence command, the one or more compatible persistence commands contained in the second different defined command set;

process the one or more compatible persistence commands to perform a persistence command contained in the defined command set, performing the one or more compatible persistence commands generating results to return to the persistence provider, the results consistent with atomic execution of at least one of the one or more compatible persistence commands; and provide the results to the persistence provider in response to processing the one or more compatible persistence commands.

19. The method as recited in claim 18, wherein the received persistence command is one of a command to modify or inspect the instance store.

20. The method as recited in claim 18, wherein the accumulated context includes one or more of an instance owner identifier and an instance identifier.

* * * * *